United States Patent
Kikuta (10) Patent No.: US 11,981,847 B2
(45) Date of Patent: May 14, 2024

(54) INFRARED RADIATION-EMITTING RESIN COMPOSITION

(71) Applicant: Firbest CO., Ltd., Tokyo (JP)

(72) Inventor: Shunichi Kikuta, Tokyo (JP)

(73) Assignee: FIRBEST CO., LTD., Tokyo (JP)

( * ) Notice: Subject to any disclaimer, the term of this patent is extended or adjusted under 35 U.S.C. 154(b) by 0 days.

(21) Appl. No.: 18/115,291

(22) Filed: Feb. 28, 2023

(65) Prior Publication Data

US 2023/0287264 A1    Sep. 14, 2023

(30) Foreign Application Priority Data

Mar. 11, 2022   (JP) .................................. 2022-038114

(51) Int. Cl.
  *C09K 11/08* (2006.01)
  *C09K 11/02* (2006.01)
  *C09K 11/65* (2006.01)

(52) U.S. Cl.
  CPC .......... *C09K 11/0805* (2013.01); *C09K 11/02* (2013.01); *C09K 11/65* (2013.01)

(58) Field of Classification Search
  CPC ..... C09K 11/0805; C09K 11/08; C09K 11/02; C09K 11/65; C09K 11/025; C09K 11/06
  See application file for complete search history.

(56) References Cited

U.S. PATENT DOCUMENTS

| | | | |
|---|---|---|---|
| 5,419,855 A | 5/1995 | Kikuta | |
| 2012/0177852 A1* | 7/2012 | Kikuta | C09K 5/14 428/34.1 |

FOREIGN PATENT DOCUMENTS

| | | |
|---|---|---|
| CN | 109180917 A | 1/2019 |
| JP | 6-80466 | 3/1994 |
| JP | H07-115914 | 12/1995 |
| JP | 2002-264280 | 9/2002 |
| JP | 2011-106035 | 6/2011 |
| JP | 2012-140565 | 7/2012 |
| WO | WO 2014/156824 | 10/2014 |

OTHER PUBLICATIONS

Machine translation of JP2011-106035A, 12 pages. (Year: 2011).*

* cited by examiner

*Primary Examiner* — Matthew E. Hoban
*Assistant Examiner* — Lynne Edmondson
(74) *Attorney, Agent, or Firm* — NIXON & VANDERHYE P.C.

(57) ABSTRACT

An infrared radiation-emitting resin composition includes an infrared radiation-emitting material and a resin. The infrared radiation-emitting material includes a titanium dioxide, a calcined hydrotalcite-like compound, and a nano-sized diamond. In the infrared radiation-emitting material, the mass ratio between the titanium dioxide and the calcined hydrotalcite-like compound is 60:40 to 90:10, while the content of the nano-sized diamond is 0.01 parts by mass or more and 0.5 parts by mass or less with respect to 100 parts by mass of the sum of the titanium dioxide and the calcined hydrotalcite-like compound.

5 Claims, 9 Drawing Sheets

FIG. 9

INFRARED RADIATION-EMITTING RESIN COMPOSITION

CROSS-REFERENCES TO RELATED APPLICATIONS

This application claims priority of Japanese Patent Application No. 2022-038114, filed Mar. 11, 2022, the entire contents of which are hereby incorporated by reference in this application.

BACKGROUND OF THE INVENTION

1. Field of the Invention

The present invention relates to an infrared radiation-emitting resin composition. More particularly, the present invention relates to an infrared radiation-emitting resin composition that is utilized for imparting functionality such as drying of various materials and heat retention in clothing materials, for heating and cooling, and for hairdressing, and the like.

2. Description of the Related Art

As infrared radiation-emitting materials, ceramics including alumina, titania, zirconia, silica, and the like have been hitherto suggested. Such materials emit far-infrared radiation, and as far-infrared radiation is absorbed by a substance, the substance is heated.

Water molecules exhibit vibration such as stretching and bending, and when water molecules absorb far-infrared radiation, the water molecules are excited and then brought into a highly vibrational state. As a result, the temperature of the water molecules is increased. Therefore, when substances including water molecules, human bodies, animals, plants, and the like absorb far-infrared radiation, temperature is increased.

Therefore, in order to efficiently warm up substances including water molecules, human bodies, animals, plants, and the like, it is necessary to use an infrared radiation-emitting material that emits far-infrared radiation having a wavelength capable of exciting the vibration of water molecules. As such an infrared radiation-emitting material, the inventors of the present invention have proposed, in Japanese Examined Patent Publication No. H07-115914, an infrared radiation-emitting material capable of emitting far-infrared radiation that is easily absorbed by animals and plants, such as human bodies.

Examined Patent Publication 1: JP H07-115914 (B2)

SUMMARY OF THE INVENTION

When an infrared radiation-emitting material is applied to, for example, a fiber that is used for a garment, the infrared radiation-emitting material absorbs far-infrared radiation emitted from the human body wearing the garment to accumulate heat, and it is necessary to emit the accumulated thermal energy to the human body as far-infrared radiation. That is, an infrared radiation-emitting material is required to absorb far-infrared radiation emitting from another substance to thereby accumulate heat, and to emit the accumulated thermal energy efficiently as far-infrared radiation.

However, the infrared radiation-emitting material described in Japanese Patent No. 2137667 has a problem that, for example, the efficiency of absorbing far-infrared radiation emitting from a human body and the like and accumulating heat is not sufficient. As a result, there is a problem that when the accumulated thermal energy is emitted as far-infrared radiation, the emission efficiency in a wavelength range (for example, 4 to 20 μm) that is easily absorbed by animals and plants, such as a human body, is not uniform, and absorption and emission of far-infrared radiation by animals and plants, such as a human body, occur insufficiently.

The present invention was achieved in view of such circumstances, and it is an object of the invention to provide an infrared radiation-emitting resin composition including an infrared radiation-emitting material having a high average value of emissivity in a predetermined wavelength range.

Thus, embodiments of the present invention are as follows.

[1] An infrared radiation-emitting resin composition including an infrared radiation-emitting material and a resin,
   wherein the infrared radiation-emitting material includes a titanium dioxide, a calcined hydrotalcite-like compound, and a nano-sized diamond,
   in the infrared radiation-emitting material, a mass ratio between the titanium dioxide and the calcined hydrotalcite-like compound is 60:40 to 90:10, and a content of the nano-sized diamond is 0.01 parts by mass or more and 0.5 parts by mass or less with respect to 100 parts by mass of a total amount of the titanium dioxide and the calcined hydrotalcite-like compound.

[2] The infrared radiation-emitting resin composition according to [1], in which the infrared radiation-emitting resin composition has a plate shape, a tubular shape, a sheet shape, or a fibrous shape, in all of which the infrared radiation-emitting material is dispersed in the resin.

[3] The infrared radiation-emitting resin composition according to [1] or [2], in which an average particle size of the titanium dioxide is 10 nm or more and 1000 nm or less.

[4] The infrared radiation-emitting resin composition according to any one of [1] to [3], in which an average particle size of the calcined hydrotalcite-like compound is 10 nm or more and 1000 nm or less.

[5] The infrared radiation-emitting resin composition according to any one of [1] to [4], in which an average particle size of secondary particles of the nano-sized diamond is 5 nm or more and 200 nm or less.

According to the present invention, an infrared radiation-emitting resin composition including an infrared radiation-emitting material having a high average value of emissivity in a predetermined wavelength range can be provided.

DETAILED DESCRIPTION OF THE PREFERRED EMBODIMENTS

Hereinafter, the present invention will be described in detail in the following order based on specific embodiments.
1. Infrared radiation-emitting resin composition
1.1. Infrared radiation-emitting material
1.2. Titanium dioxide
1.3. Calcined hydrotalcite-like compound
1.4. Nano-sized diamond
2. Method for producing infrared radiation-emitting resin composition

1. Infrared Radiation-Emitting Resin Composition

The infrared radiation-emitting resin composition according to the present embodiment has an infrared radiation-emitting material and a resin. It is preferable that the infrared radiation-emitting material is in a powder form, and it is preferable that an infrared radiation-emitting material powder is dispersed in the resin in the infrared radiation-emitting resin composition. The infrared radiation-emitting material will be described below.

As the resin, known resins can be used according to the use applications of the infrared radiation-emitting resin composition. Examples of the known resins include thermoplastic resins such as a polyester, a polyethylene, a polypropylene, a polystyrene, a polycarbonate, a polyurethane, an acrylic resin, a nylon, and a polylactic acid-based resin; thermosetting resins such as an epoxy resin, a melamine resin and a urea resin; rubbers such as a natural rubber and a synthetic rubber; and regenerated resins such as a rayon. In the present embodiment, polyolefin series such as polypropylene and polyethylene; polyester series such as polyethylene terephthalate; nylon; and the like are suitably used.

The infrared radiation-emitting resin composition is used after being molded into various shapes according to the use applications. In the present embodiment, the infrared radiation-emitting resin composition preferably has a plate shape, a tubular shape, a sheet shape, or a fibrous shape, and more preferably a fibrous shape. In a fibrous-shaped infrared radiation-emitting resin composition, an infrared radiation-emitting material is dispersed in a fibrous-shaped resin.

A fibrous-shaped infrared radiation-emitting resin composition is fiberized by a spinning process. Such a fiber is a chemical fiber artificially produced by using a chemical technique. Chemical fibers include fibers other than natural fibers, and examples include synthetic fibers (polyester-based and polyamide-based fibers), semisynthetic fibers (cellulose-based fibers), and regenerated fibers (cellulose-based fibers).

The mixing ratio of the infrared radiation-emitting material and the resin may be set according to the use application. In the present embodiment, when the infrared radiation-emitting resin composition has a plate shape, a tubular shape, or a sheet shape, it is preferable that the amount of the infrared radiation-emitting material is 10 parts by mass or more and 20 parts by mass or less with respect to 100 parts by mass of the resin. Furthermore, when the infrared radiation-emitting resin composition has a fibrous shape, it is preferable that the amount of the infrared radiation-emitting material is 0.5 parts by mass or more and 2.0 parts by mass or less with respect to 100 parts by mass of the resin.

(1.1. Infrared Radiation-Emitting Material)

The infrared radiation-emitting material is a material that emits far-infrared radiation. In the present embodiment, it is particularly preferable that the infrared radiation-emitting material is a material that emits far-infrared radiation having a wavelength suitable for exciting water molecules included in substances, human bodies, animals, plants, and the like. Furthermore, it is preferable that this infrared radiation-emitting material is a material having a high far-infrared radiation emissivity at a wavelength in the range of from 5 μm to 20 μm, and particularly preferably in the range of from 7 μm to 14 μm. The far-infrared radiation emissivity can be measured by using a Fourier Transform Infrared Spectroscopy (FTIR) based on, for example, a measurement method approved by the Japan Far Infrared Rays Association.

In the present embodiment, the infrared radiation-emitting material includes a titanium dioxide, a calcined hydrotalcite-like compound, and a nano-sized diamond. Furthermore, in the infrared radiation-emitting material, the mass ratio between the titanium dioxide and the calcined hydrotalcite-like compound is 60:40 to 90:10, and the content of the nano-sized diamond is 0.01 parts by mass or more and 0.5 parts by mass or less with respect to 100 parts by mass of the sum of the titanium dioxide and the calcined hydrotalcite-like compound.

When the mass ratio between the titanium dioxide and the calcined hydrotalcite-like compound is in the above-described range, the far-infrared radiation emission efficiency of the infrared radiation-emitting material according to the present embodiment can be increased.

It is preferable that the mass ratio between the titanium dioxide and the calcined hydrotalcite-like compound is 70:30 to 80:20.

Furthermore, since the nano-sized diamond has a very high thermal conductivity, the absorption and emission efficiency for infrared radiation-emitting thermal energy of the infrared radiation-emitting material can be increased when the infrared radiation-emitting material includes the nano-sized diamond. Therefore, by adjusting the content of the nano-sized diamond to be in the above-described range, the far-infrared radiation emission efficiency of the infrared radiation-emitting material according to the present embodiment can be increased, and the emission efficiency at a wavelength in the range of from 5 μm to 20 μm can be made uniform. However, from the viewpoint of cost, the upper limit of the content of the nano-sized diamond is set to the above-described value.

It is preferable that the content of the nano-sized diamond is 0.02 parts by mass or more and 0.2 parts by mass or less with respect to 100 parts by mass of the sum of the titanium dioxide and the calcined hydrotalcite-like compound.

(1.2. Titanium Dioxide)

Titanium dioxide exists in the forms of anatase type (tetragonal), rutile type (tetragonal), and brookite type (orthorhombic) according to the difference in the crystal structure. In the present embodiment, the crystal structure of titanium dioxide is not particularly limited; however, from the viewpoint of availability as an industrial raw material, the crystal structure is preferably anatase type or rutile type. Furthermore, as a method for industrially producing titanium dioxide, a chlorine method and a sulfuric acid method are known; however, in the present embodiment, the method for producing titanium dioxide is not particularly limited.

In the present embodiment, it is preferable that the titanium dioxide is in a powder form. The average particle size D50 of the titanium dioxide powder is preferably 10 nm or more and 1000 nm or less, and more preferably 100 nm or more and 700 nm or less. In the present embodiment, the average particle size D50 is a value measured by a laser diffraction method.

Examples of commercially available products of the above-described titanium dioxide include "CR-60" (rutile type) manufactured by ISHIHARA SANGYO KAISHA, LTD., "A-100" (anatase type) manufactured by ISHIHARA SANGYO KAISHA, LTD., "TAF-520" (anatase type) manufactured by Fuji Titanium Industry Co., Ltd., "TA301" (anatase type) manufactured by Fuji Titanium Industry Co., Ltd., "JR-800" (rutile type) manufactured by TAYCA CORPORATION, "JA-1" (anatase type) manufactured by TAYCA CORPORATION, "SA-1" (anatase type) manufactured by SAKAI CHEMICAL INDUSTRY CO., LTD., and "R-11.P" (rutile type) manufactured by SAKAI CHEMICAL INDUSTRY CO., LTD.

1.3. Calcined Hydrotalcite-Like Compound

A hydrotalcite-like compound is a layered inorganic compound represented by chemical formula: $Mg_{1-x}Al_x(OH)_2(CO_3)_{x/2} \cdot mH_2O$. As is obvious from the chemical formula, a hydrotalcite-like compound includes water of crystallization, and the water of crystallization is present between layers. When a hydrotalcite-like compound is heated, elimination of the water of crystallization occurs at around 180° C. to 230° C.

On the other hand, the infrared radiation-emitting resin composition according to the present embodiment is obtained by blending an infrared radiation-emitting material with a resin; however, each treatment (kneading, crosslinking, or the like) at the time of blending may be carried out after heating to a temperature of 200° C. or higher. At this time, when the infrared radiation-emitting resin composition includes a hydrotalcite-like compound, the water of crystallization included in the hydrotalcite-like compound may be removed and then contaminated the infrared radiation-emitting resin composition, and defects such as molding failure and foaming in the infrared radiation-emitting resin composition may occur.

Thus, in the present embodiment, in order to suppress the above-described defects, a calcined hydrotalcite-like compound obtainable by removing the water of crystallization included in a hydrotalcite-like compound is used. Specifically, with regard to a calcined hydrotalcite-like compound, "m" in the above-described chemical formula is preferably in the range of $0 \leq m \leq 0.05$ as a result of removal of the water of crystallization.

In order to set the range of "m" to be $0 \leq m \leq 0.05$, for example, the hydrotalcite-like compound may be dried under predetermined drying conditions. The drying conditions are not particularly limited; however, for example, the drying temperature is preferably 120° C. to 350° C., more preferably 130° C. to 340° C., and even more preferably 140° C. to 330° C. Furthermore, the drying time is preferably 1 to 24 hours, more preferably 1.5 to 22 hours, and even more preferably 2 to 20 hours.

In the present embodiment, it is preferable that the calcined hydrotalcite-like compound is in a powder form. The average particle size D50 of the calcined hydrotalcite-like compound powder is preferably 10 nm or more and 1000 nm or less, and more preferably 100 nm or more and 700 nm or less. In the present embodiment, the average particle size D50 is a value measured by a laser diffraction method.

Incidentally, it is preferable that the average particle size of the titanium dioxide powder and the average particle size of the calcined hydrotalcite-like compound powder are similar.

Examples of commercially available products of the above-described calcined hydrotalcite-like compound include "DHT-4C" ($Mg_{4.3}Al_2(OH)_{12.6}CO_3 \cdot mH_2O$: $0 \leq m \leq 0.05$) manufactured by Kyowa Chemical Industry Co., Ltd., "DHT-4A-2" ($Mg_{4.3}Al_2(OH)_{12.6}CO_3 \cdot mH_2O$: $0 \leq m \leq 0.05$) manufactured by Kyowa Chemical Industry Co., Ltd., and "HT-9" ($Mg_{1-x}Al_x(OH)_{x/2}CO_3 \cdot mH_2O$: $0 \leq x \leq 0.5$, $0 \leq m \leq 0.05$) manufactured by SAKAI CHEMICAL INDUSTRY CO., LTD.

(1.4. Nano-Sized Diamond)

Nano-sized diamond is fine particulate diamond, and the surface layer of a core having a diamond structure is coated with a carbon layer such as amorphous carbon, graphene, or graphite. Nano-sized diamond is excited by infrared radiation and emits infrared radiation having a wavelength of about 1 to 10 μm. Since the number of carriers to be excited is large as compared with oxides, even when the content of the nano-sized diamond is in the above-described range, the far-infrared radiation emission efficiency can be sufficiently increased.

In the present embodiment, the nano-sized diamond is a collection of secondary particles composed of aggregates of diamond particles having a primary particle size of about 2 to 7 nm. The average particle size D50 of the secondary particles is preferably 50 nm or more and 200 nm or less, and more preferably 80 nm or more and 150 nm or less. In the present embodiment, the average particle size D50 of the nano-sized diamond is a value measured by a dynamic light scattering method using laser light.

The method for producing the nano-sized diamond is not particularly limited; however, usually, the nano-sized diamond is produced by a detonation (explosion) method. In the detonation method, detonating powder including carbon is detonated in a tightly sealed state, and as the crystal structure of a portion of carbon in the detonating powder is changed to the diamond structure under the high temperature and high pressure obtainable at the time of detonation, fine particulate diamond is obtained.

Examples of commercially available products of the above-described nano-sized diamond include "SCM NANODIA" (average particle size D50: 50 to 100 nm) manufactured by Dia Materials Co., Ltd., "NanoAmando" (average particle size primary particles: 2.6 nm±0.5 nm, secondary particles: 50 nm) manufactured by NanoCarbon Research Institute, Ltd., and "DINNOVARE" (average particle size primary particles: 4 to 6 nm) manufactured by Daicel Corporation.

2. Method for Producing Infrared Radiation-Emitting Resin Composition

The infrared radiation-emitting resin composition according to the present embodiment is obtained as a mixture by mixing a resin and an infrared radiation-emitting material. In the mixture, it is preferable that the infrared radiation-emitting material is dispersed in the resin.

Mixing of the resin and the infrared radiation-emitting material is carried out by, for example, melt-kneading the resin and the infrared radiation-emitting material using a known kneading machine. Examples of the known kneading machine include a mixer, a kneader, a roll, and an extruder. Furthermore, a mixture of the resin and the infrared radiation-emitting material may be obtained by producing a masterbatch including the infrared radiation-emitting material at a high concentration and kneading the masterbatch with the remaining resin raw material.

In the present embodiment, it is preferable that the obtained infrared radiation-emitting resin composition is molded into a predetermined shape according to the use application. Molding of the infrared radiation-emitting resin composition may be performed simultaneously with the above-described mixing.

When the infrared radiation-emitting resin composition is molded into a plate shape, a tubular shape, or a sheet shape, it is preferable to use molding methods such as injection molding, extrusion molding, T-die molding, and calendar molding. Furthermore, when the infrared radiation-emitting resin composition is molded into a fibrous shape, it is preferable to use spinning methods such as melt spinning, dry spinning, wet spinning, and centrifugal spinning. The infrared radiation-emitting resin composition that has been molded into a fibrous shape is processed into, for example, a woven fabric, a knitted fabric, a nonwoven fabric, a felt, a punching sheet, and the like.

Thus, embodiments of the present invention have been described; however, the present invention is not intended to be limited to the above-described embodiments, and various modifications may be made within the scope of the present invention.

EXAMPLES

Hereinafter, the invention will be described in more detail by using Examples; however, the present invention is not intended to be limited to these Examples.

Test 1

As raw materials of an infrared radiation-emitting material, a titanium dioxide powder ("TA301" manufactured by Fuji Titanium Industry Co., Ltd.), a calcined hydrotalcite-like compound powder ("HT-9" manufactured by SAKAI CHEMICAL INDUSTRY CO., LTD.), and a nano-sized diamond powder ("NanoAmando" manufactured by Nano-Carbon Research Institute, Ltd.) were prepared. The average particle size D50 of the titanium dioxide powder was 580 nm, the average particle size D50 of the calcined hydrotalcite-like compound powder was 500 nm, and the average particle size of secondary particles of the nano-sized diamond was 50 nm.

The prepared titanium dioxide powder, calcined hydrotalcite-like compound, and nano-sized diamond were mixed in the formulation indicated in Table 1 to obtain infrared radiation-emitting materials. Incidentally, in Comparative Example 1B-8, 90 parts by mass of the titanium dioxide powder, 10 parts by mass of a silicon dioxide powder ("RHEOROSIL (registered trademark) MT-10" manufactured by Tokuyama Corporation), and 5 parts by mass of a yttrium oxide ("3NUU" manufactured by Shin-Etsu Rare Earths Co., Ltd.) were mixed to obtain an infrared radiation-emitting material.

TABLE 1

| Infrared radiation-emitting material | Example 1A-1 (parts by mass) | Example 1A-2 (parts by mass) | Example 1A-3 (parts by mass) | Example 1A-4 (parts by mass) | Example 1A-5 (parts by mass) | Example 1A-6 (parts by mass) | Comparative Example 1B-1 (parts by mass) | Comparative Example 1B-2 (parts by mass) |
|---|---|---|---|---|---|---|---|---|
| Titanium dioxide | 85 | 90 | 80 | 90 | 70 | 60 | 100 | 0 |
| Calcined hydrotalcite-like compound | 15 | 10 | 20 | 10 | 30 | 40 | 0 | 100 |
| Silicon dioxide | | | | | | | | |
| Nano-sized diamond | 0.02 | 0.02 | 0.03 | 0.05 | 0.1 | 0.5 | 0 | 0 |
| Yttrium oxide | | | | | | | | |

| Infrared radiation-emitting material | Comparative Example 1B-3 (parts by mass) | Comparative Example 1B-4 (parts by mass) | Comparative Example 1B-5 (parts by mass) | Comparative Example 1B-6 (parts by mass) | Comparative Example 1B-7 (parts by mass) | Comparative Example 1B-8 (parts by mass) |
|---|---|---|---|---|---|---|
| Titanium dioxide | 50 | 20 | 95 | 25 | 0 | 90 |
| Calcined hydrotalcite-like compound | 50 | 80 | 5 | 75 | 0 | |
| Silicon dioxide | | | | | | 10 |
| Nano-sized diamond | 0.005 | 0 | 1 | 0.001 | 0.005 | |
| Yttrium oxide | | | | | | 5 |

The obtained infrared radiation-emitting material and a polyethylene resin were blended such that the ratio between the total mass of titanium dioxide and the calcined hydrotalcite-like compound in the infrared radiation-emitting material and the mass of the polyethylene resin was 1:9, and the mixture was kneaded for 10 minutes at a speed of rotation of 50 rpm and a resin temperature of 180° C. by using a kneading machine ("PLASTI-CORDER LAB-STATION W50EHT type" manufactured by Brabender GmbH & Co. KG) to obtain pellets.

The obtained pellets were subjected to hot pressing by using a press molding machine (manufactured by Toho Press Manufacturing, Ltd.) under the conditions of a heating temperature of 200° C. and a gauge pressure of 10 MPa, and a sheet-shaped infrared radiation-emitting resin composition having a dimension of 100 mm×100 mm×0.6 mm was obtained.

Incidentally, in Comparative Example 1B-7, 0.005 parts by mass of nano-sized diamond was blended with 100 parts by mass of a polyethylene resin, and a sheet-shaped infrared radiation-emitting resin composition was obtained in the same manner as described above. Furthermore, in Comparative Example 1B-8, the components were blended with a polyethylene resin such that the ratio between the total mass of the titanium dioxide and the silicon dioxide, and the mass of the polyethylene resin was 1:9, and a sheet-shaped infrared radiation-emitting resin composition was obtained in the same manner as described above. In addition, as a blank, a sheet-shaped resin composition composed only of a polyethylene resin, without including an infrared radiation-emitting material, was obtained in the same manner as described above.

For the obtained infrared radiation-emitting resin compositions, the far-infrared spectral emissivity was measured as follows. From an obtained sheet-shaped infrared radiation-emitting resin composition, a test specimen having a dimension of 40 mm×40 mm was cut out, and the far-infrared spectral emissivity for the wavelength range of far-infrared radiation (5 to 20 μm) was measured by an FT-IR method by using a far-infrared spectral emissivity measuring machine ("SpectrumOne Frontier T" manufactured by PerkinElmer, Inc.) under the conditions of a measurement temperature of 40° C., an environmental temperature of 20° C., and a humidity of 65%. Furthermore, also for the blank sample, the far-infrared spectral emissivity was measured under the above-described conditions. When the average emissivity of the blank in the wavelength range of far-infrared radiation (7 to 14 μm) was calculated from the measurement results, the average emissivity was 83.375%.

In the Examples, in the light of the criteria for the evaluation items "emission characteristics and spectral emissivity" in the "Far Infrared Radiation Textile Products Evaluation Criteria" specified by the Japan Far Infrared Rays Association, a sample having an average emissivity of 92.0% or higher in the wavelength range of far-infrared radiation (7 to 14 μm) was considered satisfactory. The results are shown in Table 2 and FIGS. 1 to 6.

TABLE 2

| Measurement range | Far-infrared spectral emissivity | | | | | | | |
|---|---|---|---|---|---|---|---|---|
| | Example 1A-1 | Example 1A-2 | Example 1A-3 | Example 1A-4 | Example 1A-5 | Example 1A-6 | Comparative Example 1B-1 | Comparative Example 1B-2 |
| 7 μm | 94.8 | 94.7 | 94.4 | 94.4 | 93.7 | 93.5 | 92.1 | 92.6 |
| 8 μm | 93.9 | 93.8 | 94.2 | 93.8 | 93.7 | 93.1 | 91.2 | 91.8 |
| 9 μm | 93.6 | 93.4 | 94.0 | 93.2 | 93.4 | 92.9 | 87.9 | 88.9 |
| 10 μm | 93.3 | 93.1 | 93.5 | 92.8 | 93.1 | 92.4 | 87.2 | 88.3 |
| 11 μm | 93.0 | 92.8 | 92.8 | 92.5 | 92.4 | 92.0 | 89.9 | 89.8 |
| 12 μm | 92.5 | 92.2 | 92.0 | 91.9 | 91.6 | 91.3 | 90.3 | 90.4 |
| 13 μm | 92.1 | 91.8 | 91.7 | 91.5 | 91.3 | 90.9 | 90.0 | 89.5 |
| 14 μm | 92.1 | 91.8 | 91.9 | 91.6 | 91.0 | 90.9 | 89.6 | 88.6 |
| Average value | 93.16 | 92.95 | 93.06 | 92.71 | 92.53 | 92.12 | 89.78 | 89.99 |

| Measurement range | Far-infrared spectral emissivity | | | | | |
|---|---|---|---|---|---|---|
| | Comparative Example 1B-3 | Comparative Example 1B-4 | Comparative Example 1B-5 | Comparative Example 1B-6 | Comparative Example 1B-7 | Comparative Example 1B-8 |
| 7 μm | 89.9 | 92.2 | 93.0 | 92.8 | 89.8 | 92.0 |
| 8 μm | 89.8 | 89.6 | 92.8 | 92.5 | 89.3 | 90.6 |
| 9 μm | 89.4 | 87.0 | 92.6 | 92.2 | 86.0 | 89.6 |
| 10 μm | 89.1 | 86.8 | 92.1 | 91.8 | 85.3 | 89.6 |
| 11 μm | 89.2 | 89.6 | 91.7 | 91.4 | 88.2 | 90.3 |
| 12 μm | 88.8 | 89.9 | 90.9 | 90.6 | 88.6 | 90.0 |
| 13 μm | 88.4 | 89.8 | 90.5 | 90.3 | 88.5 | 89.9 |
| 14 μm | 88.2 | 90.0 | 90.3 | 90.0 | 88.6 | 89.7 |
| Average value | 89.10 | 89.36 | 91.74 | 91.45 | 88.04 | 90.21 |

From Table 2 and FIGS. 1 to 6, it could be confirmed that when the infrared radiation-emitting material includes the above-mentioned components, and the contents thereof are within the above-mentioned ranges, an infrared radiation-emitting resin composition having a high average emissivity is obtained.

Test 2

As raw materials of an infrared radiation-emitting material, a titanium dioxide powder ("CR-60" manufactured by ISHIHARA SANGYO KAISHA, LTD.), a calcined hydrotalcite-like compound powder ("HT-9" manufactured by SAKAI CHEMICAL INDUSTRY CO., LTD.), and a nano-sized diamond powder ("NanoAmando" manufactured by NanoCarbon Research Institute, Ltd.) were prepared. The average particle size D50 of the titanium dioxide powder was 210 nm, the average particle size D50 of the calcined hydrotalcite-like compound powder was 500 nm, and the average particle size D50 of secondary particles of the nano-sized diamond was 50 nm.

85 parts by mass of the prepared titanium dioxide powder, 15 parts by mass of the calcined hydrotalcite-like compound powder, and 0.02 parts by mass of the nano-sized diamond were mixed to obtain an infrared radiation-emitting material (Example 2A-1). The infrared radiation-emitting material of Example 2A-1 and a nylon resin were blended such that the mass ratio between the infrared radiation-emitting material and the nylon resin was 1:9, and the mixture was kneaded by using a resin melting and kneading machine ("50C type 150" manufactured by Toyo Seiki Seisaku-sho, Ltd.) under the conditions of a heating temperature of 270° C. and a speed of rotation of 100 rpm to produce a masterbatch 2AM-1.

Next, the masterbatch 2AM-1 and a nylon resin were blended such that the mass ratio between the masterbatch 2AM-1 and the nylon resin was 1:9, and the mixture was melt-spun by using a multifilament production apparatus (manufactured by Musashino Kikai Co., Ltd.) under the conditions of a heating temperature of 280° C. to produce a nylon multifilament yarn AMF-1 having a degree of fineness of 88 dtex and a filament count of 36 f.

The produced nylon multifilament yarn AMF-1 was processed by a POY-DTY method (method of performing partial drawing by spinning at a high speed to obtain a Partially Oriented Yarn (POY) and converting the POY into a Draw Textured Yarn (DTY) through drawing and false twisting processes) under the conditions of a false twisted POY drawing roller winding speed of 4,000 m/min to produce a POY yarn, the POY yarn was subjected to twisting at a rate of 3,200 t/m of draw textured yarn DTY and heat-setting, and the resultant was untwisted and processed into a bulky and elastic yarn.

The processed AMF-1 was used to produce cloth by using a circular knitting machine, and a pair of leggings (AMF-1) was produced.

A nylon multifilament yarn BMF-1 was produced by the same method as described above, except that an infrared radiation-emitting material (Comparative Example 2B-3) obtained by mixing 50 parts by mass of a titanium dioxide powder, 50 parts by mass of a calcined hydrotalcite-like compound powder, and 0.005 parts by mass of nano-sized diamond was used, and a pair of leggings (BMF-1) was produced by using the produced nylon multifilament yarn BMF-1.

In addition, a nylon multifilament yarn L-1 was produced by the same method as described above, except that a resin composition composed of a nylon resin without including an infrared radiation-emitting material was used, and a pair of leggings (L-1) was produced by using the produced nylon multifilament yarn L-1.

The heat retaining property of the leggings was evaluated by wearing the obtained leggings and measuring the body surface temperature after taking off the leggings according to a testing method described below.

A test subject entered a laboratory chamber maintained at an indoor temperature of 20° C. and an indoor humidity of 65%, subsequently the test subject maintained a sitting position in a resting state, the body surface temperature of a measurement site (thigh) was measured by using a thermography (FLIR A615 manufactured by FLIR Systems, Inc.), and the body surface temperature at a stable time point was designated as body surface temperature before wearing. After checking, the test subject took on the leggings produced as described above and maintained a sitting position in a resting state, and after 20 minutes, the test subject took off the leggings. The body surface temperature of the thigh immediately after taking off the leggings was measured by using a thermography ("FLIR A615" manufactured by FLIR Systems, Inc.). The results are shown in Table 3 and FIG. 7.

TABLE 3

|  | Blank L-1 Body surface temperature (° C.) | Comparative Example BMF-1 Body surface temperature (° C.) | Example AMF-1 Body surface temperature (° C.) |
| --- | --- | --- | --- |
| Before wearing | 29.2 | 29.2 | 29.2 |
| Immediately after taking off after wearing for 20 minutes | 31.1 | 31.3 | 31.9 |

Figure 1:
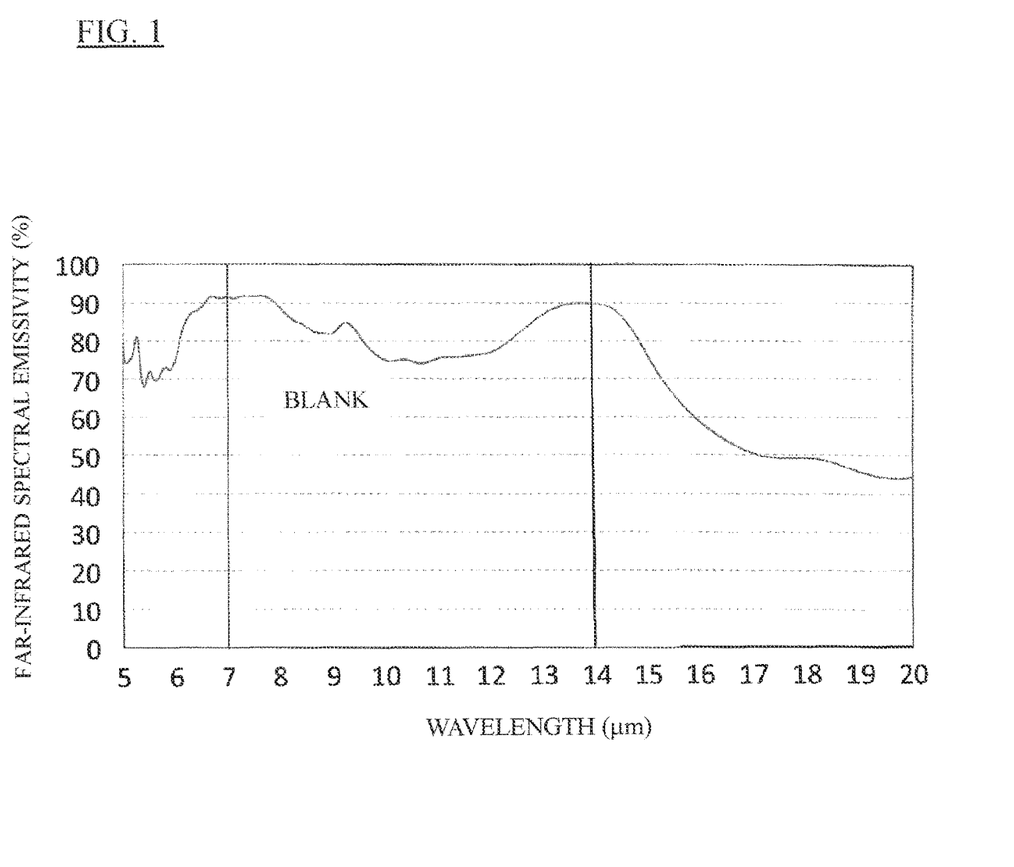
FIG. 1 is a graph showing a far-infrared radiation emissivity at a wavelength of 5 to 20 μm for a blank sample.
Figure 2:
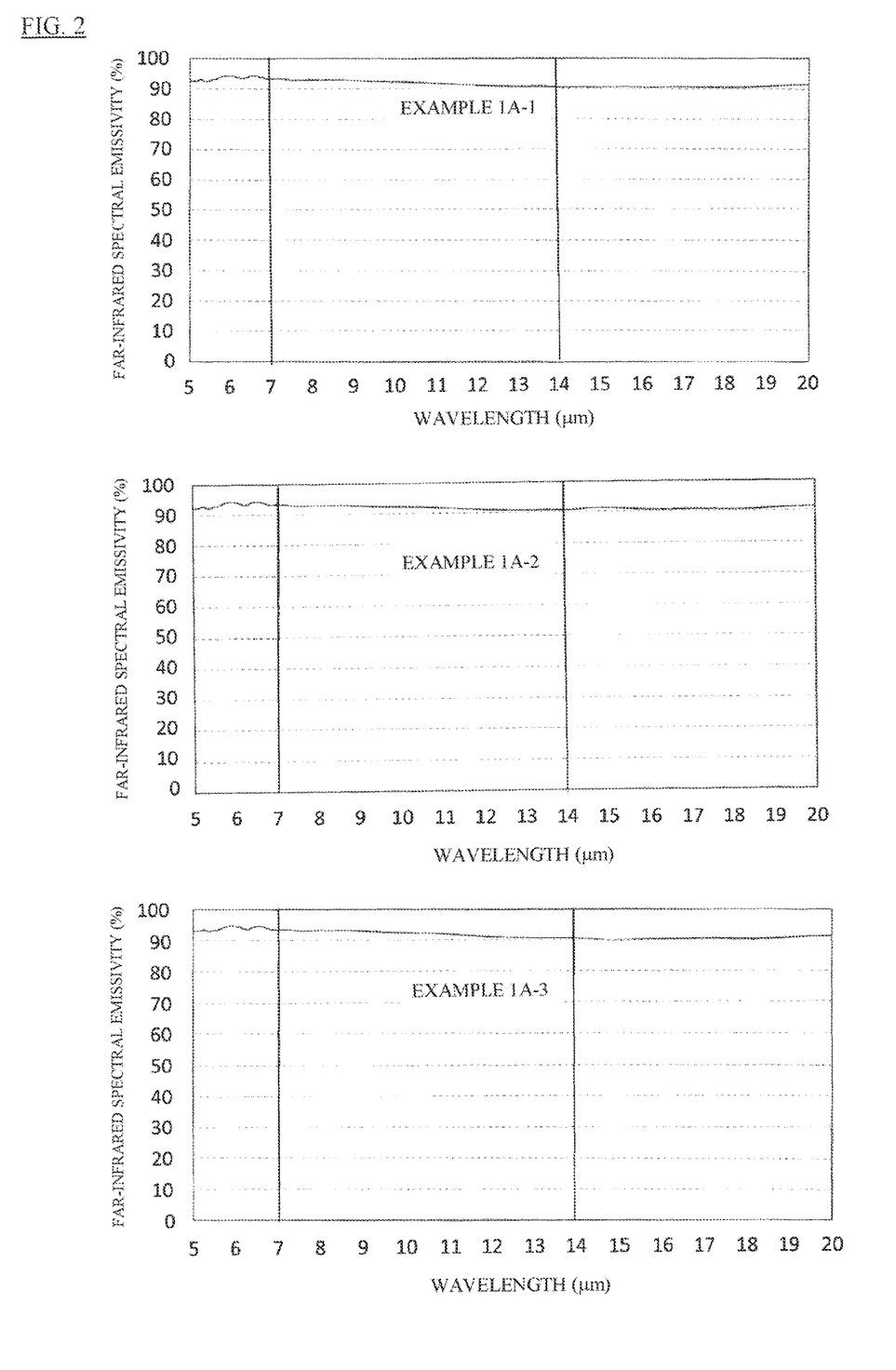
FIG. 2 is graphs showing the far-infrared radiation emissivity at a wavelength of 5 to 20 μm for samples of Examples 1A-1 to 1A-3.
Figure 3:
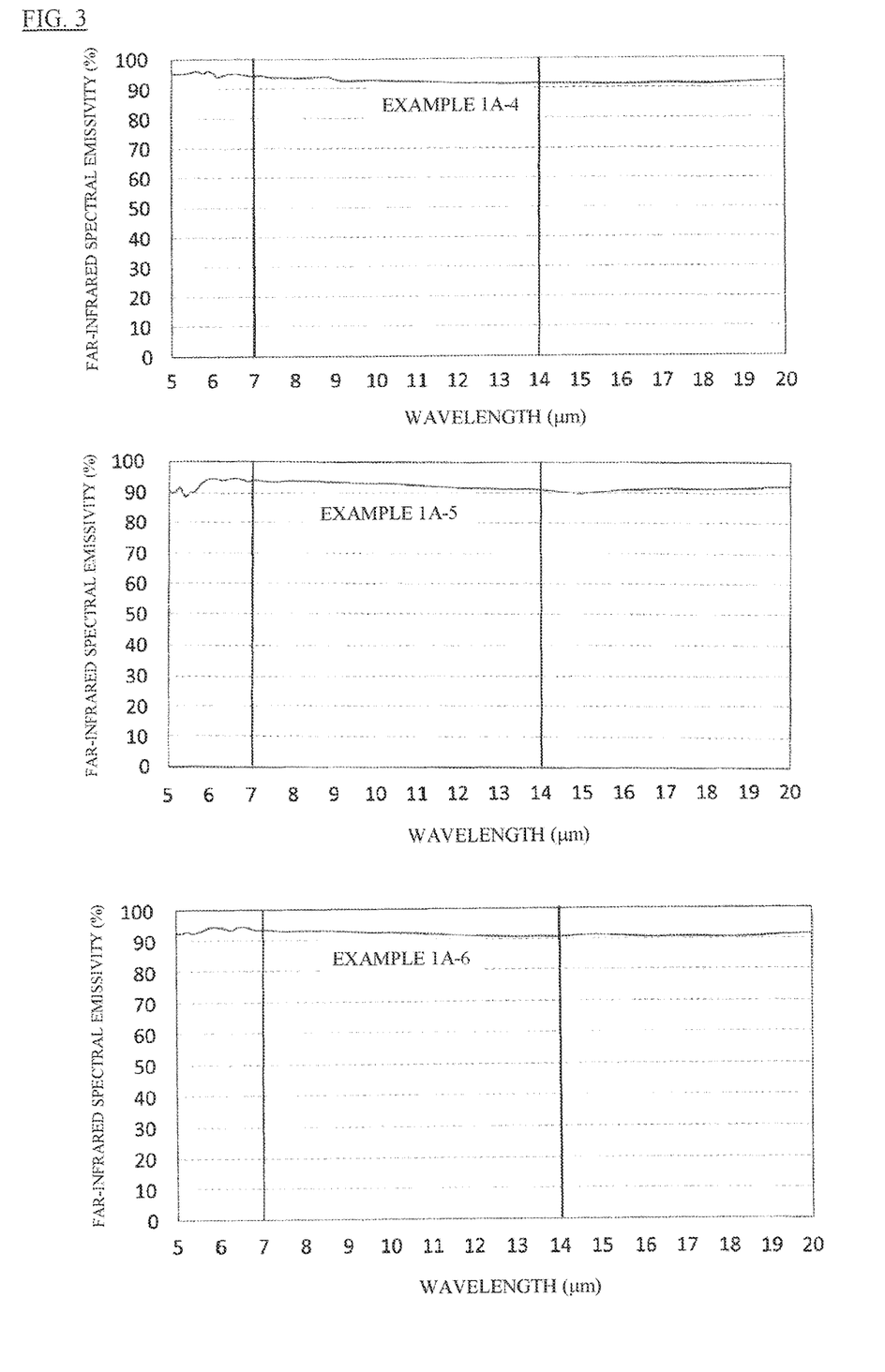
FIG. 3 is graphs showing the far-infrared radiation emissivity at a wavelength of 5 to 20 μm for samples of Examples 1A-4 to 1A-6.
Figure 4:
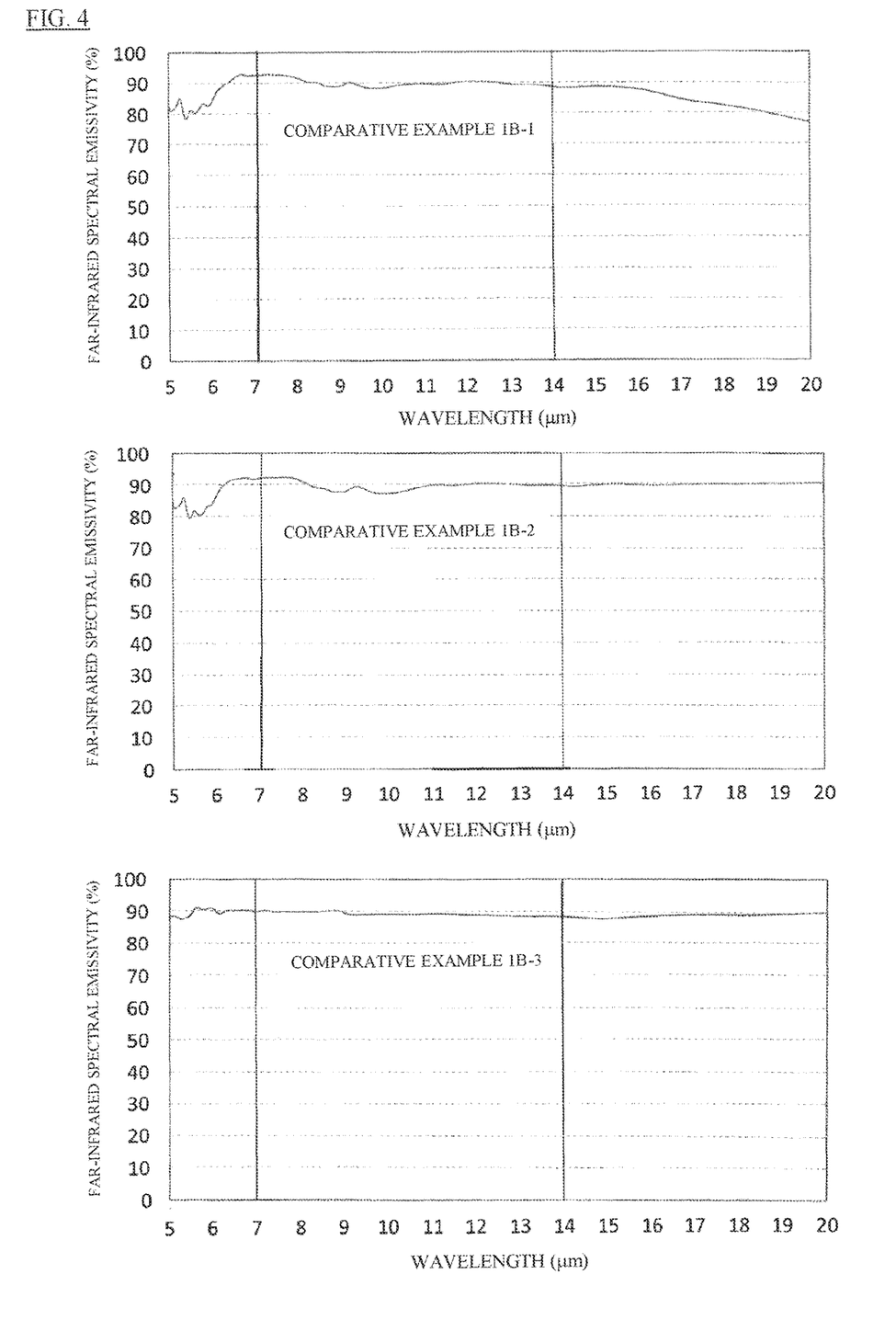
FIG. 4 is graphs showing the far-infrared radiation emissivity at a wavelength of 5 to 20 μm for samples of Comparative Examples 1B-1 to 1B-3.
Figure 5:
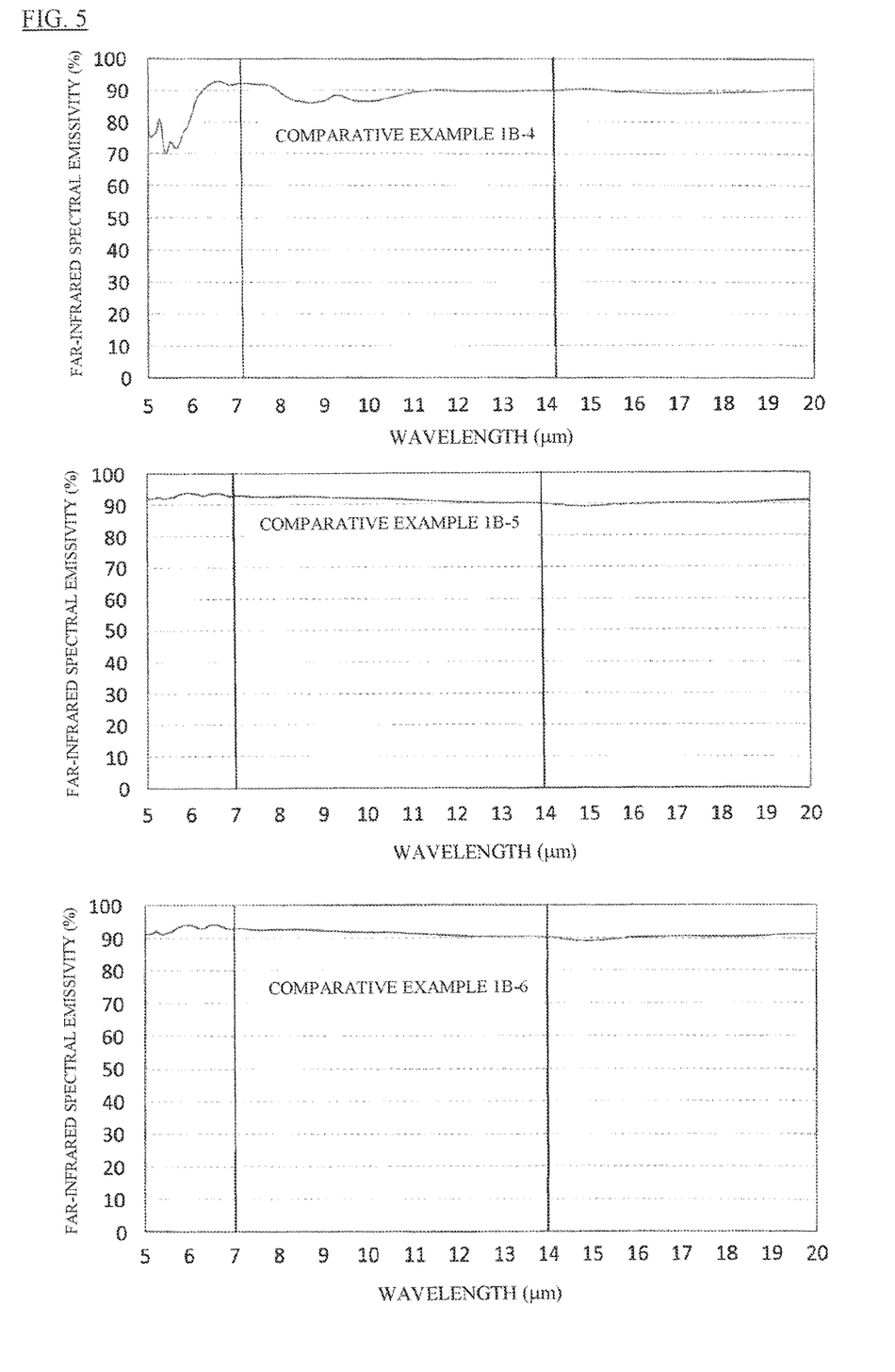
FIG. 5 is graphs showing the far-infrared radiation emissivity at a wavelength of 5 to 20 μm for samples of Comparative Examples 1B-4 to 1B-6.
Figure 6:
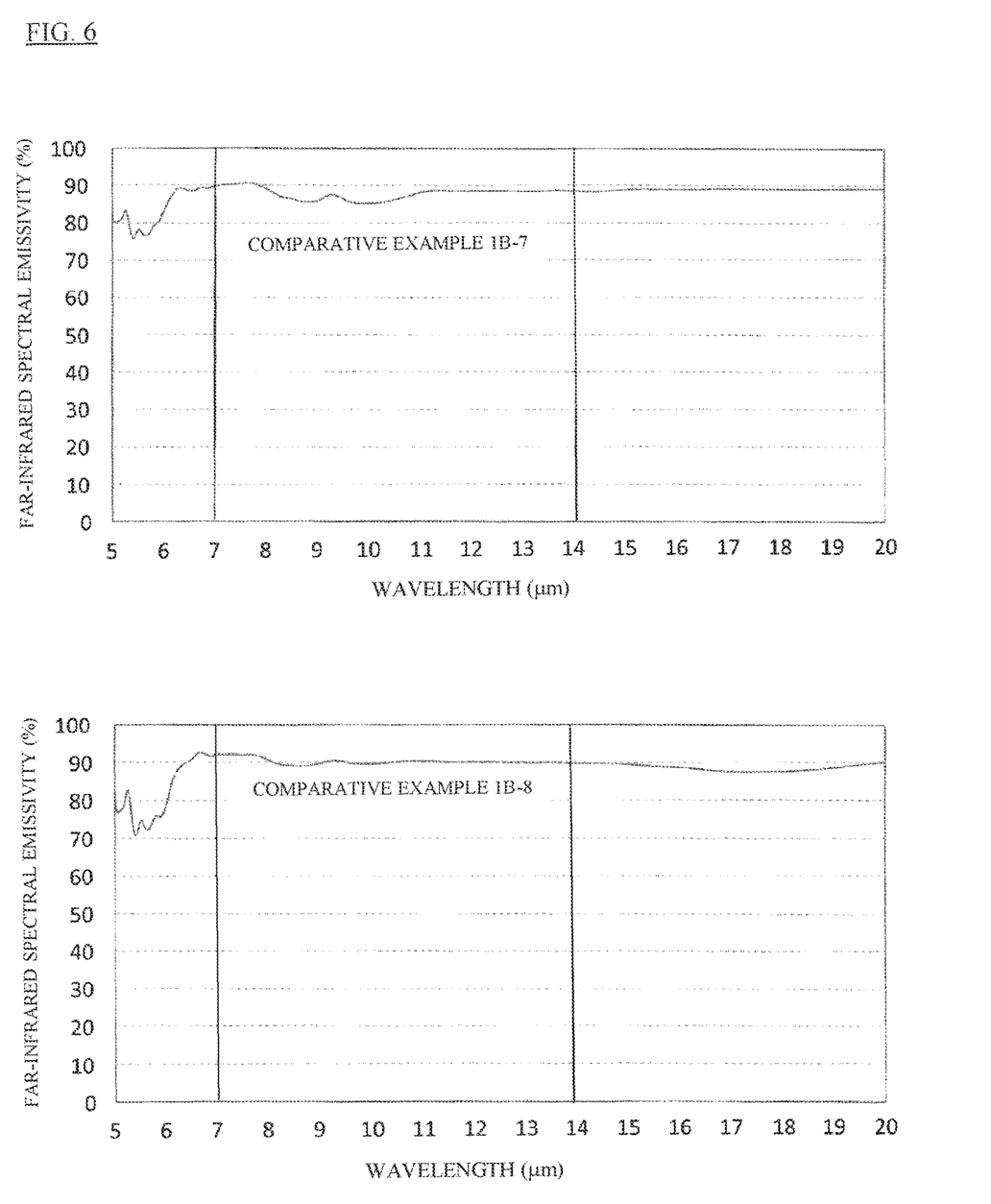
FIG. 6 is graphs showing the far-infrared radiation emissivity at a wavelength of 5 to 20 μm for samples of Comparative Examples 1B-7 and 1B-8.
Figure 7:
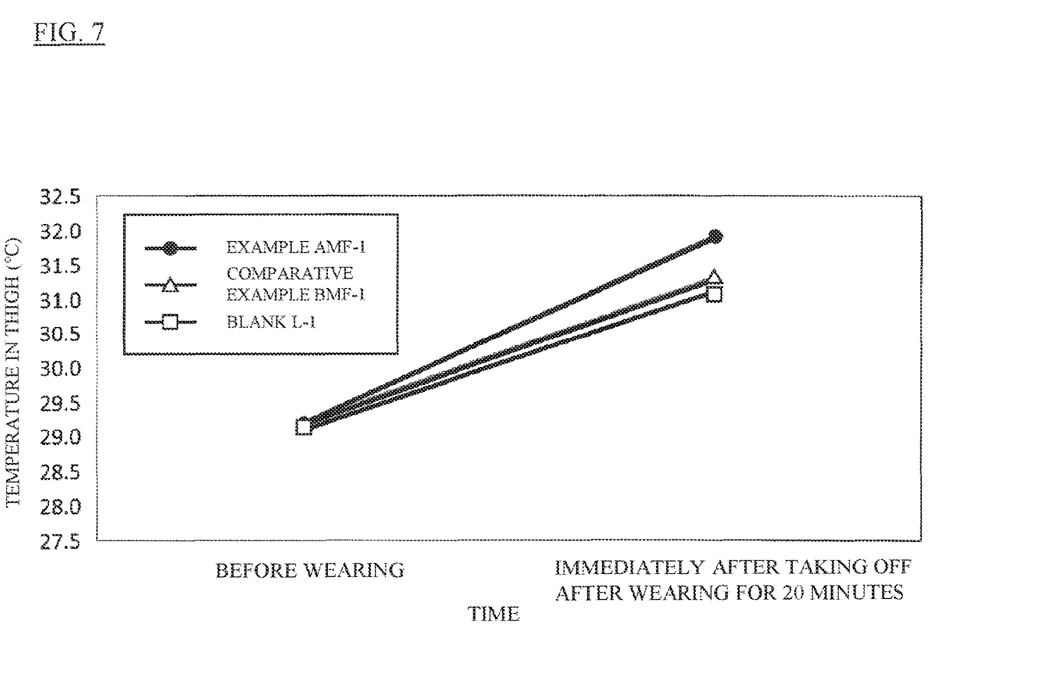
FIG. 7 is a graph showing the body surface temperatures of the thigh before wearing leggings of Example AMF-1, Comparative Example BMF-1, and Blank L-1 and 20 minutes after wearing the leggings.

From Table 3 and FIG. 7, it was confirmed that the leggings (AMF-1) exhibited good heat retaining property.

Test 3

As raw materials of an infrared radiation-emitting material, a titanium dioxide powder ("A-100" manufactured by ISHIHARA SANGYO KAISHA, LTD.), a calcined hydrotalcite-like compound powder ("DHT-4A-2" manufactured by Kyowa Chemical Industry Co., Ltd.), and a nano-sized diamond powder ("SCM NANODIA" manufactured by Dia Materials Co., Ltd.) were prepared. The average particle size D50 of the titanium dioxide powder was 100 nm, the average particle size D50 of the calcined hydrotalcite-like compound powder was 400 nm, and the average particle size D50 of secondary particles of the nano-sized diamond was 50 to 100 nm.

80 parts by mass of the prepared titanium dioxide powder, 20 parts by mass of the calcined hydrotalcite-like compound powder, and 0.03 parts by mass of the nano-sized diamond were mixed to obtain an infrared radiation-emitting material (Example 3A-3). The infrared radiation-emitting material of Example 3A-3 and a polyethylene terephthalate (PET) resin were blended such that the mass ratio between the infrared radiation-emitting material and the polyethylene terephthalate resin was 1:9, and the mixture was kneaded by using a resin melting and kneading machine ("50C type 150" manufactured by Toyo Seiki Seisaku-sho, Ltd.) under the conditions of a heating temperature of 280° C. and a speed of rotation of 100 rpm to produce a masterbatch 3MA-1.

Next, the obtained masterbatch 3MA-1 and the PET resin were blended such that the mass ratio between the masterbatch 3MA-1 and the PET resin was 1:9, and the mixture was melt-spun by using a staple fiber spinning and drawing production apparatus under the conditions of a heating temperature of 280° C. to produce a PET resin staple yarn PSA-1 having a degree of fineness of 6.6 dtex and a fiber length of 51 mm.

The produced staple yarn PSA-1 was used as a raw material, and a web was formed by using a carding machine ("H2DS" manufactured by Ikegami Kikai K.K.). The formed web was laminated in layers with a layering machine ("IK30-2" manufactured by Ikegami Kikai K.K.), and the laminate was produced into a PET nonwoven fabric NWA-1 having a width of 1000 mm and a cloth thickness of 100 g/m² by using a nonwoven fabric needle punching machine ("NL21" manufactured by Fehrer AG).

A PET resin staple yarn PSB-1 was produced by the same method as described above, except that an infrared radiation-emitting material (Comparative Example 3B-4) obtained by mixing 20 parts by mass of a titanium dioxide powder and 80 parts by mass of a calcined hydrotalcite-like compound powder was used, and a PET nonwoven fabric NWB-1 was produced by using the produced staple yarn PSB-1.

In addition, a PET resin staple yarn BL-1 was produced by the same method as described above, except that a resin composition composed of a PET resin without including an infrared radiation-emitting material was used, and a PET nonwoven fabric BL-1 was produced by using the produced staple yarn BL-1.

The temperature changes generated when the produced PET nonwoven fabric was heated were measured as follows.

A test specimen having a dimension of 200 mm×150 mm was cut out from the obtained PET nonwoven fabric. The cut test specimen was heated from an upward diagonal direction of the test specimen by using two halogen lamps ("CHP-500" manufactured by CASTER Co., Ltd.) disposed so as to face each other, with the test specimen interposed therebetween, and the average temperature of the test specimen (PET nonwoven fabric) during a time period starting from the initiation of heating to 140 seconds was measured. The power output of the halogen lamps was 500 W. The average temperature of the test specimen was measured by detecting a spectrum at 7.5 to 14 μm from above the test specimen by using an infrared camera ("FLIR SC655" manufactured by FLIR Systems, Inc.). The results are shown in Table 4 and FIG. 8.

TABLE 4

| | Average temperature of nonwoven fabric after initiation of heating (° C.) | | | | |
|---|---|---|---|---|---|
| | 0 seconds | 20 seconds | 50 seconds | 100 seconds | 140 seconds |
| Example NWA-1 | 23.0 | 38.4 | 38.6 | 40.2 | 45.0 |
| Comparative Example NWB-1 | 23.0 | 35.8 | 35.9 | 38.3 | 43.1 |
| Blank BL-1 | 23.0 | 34.3 | 34.8 | 36.7 | 41.8 |

Figure 8:
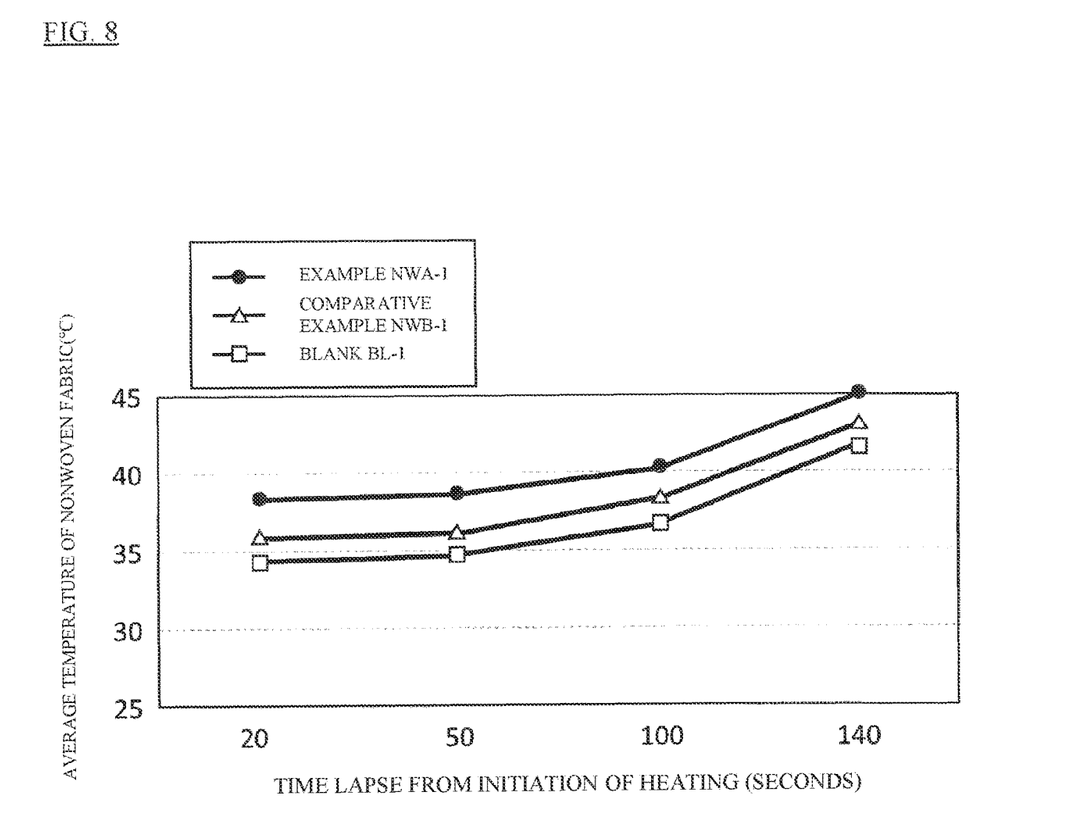
FIG. 8 is a graph showing the temperature changes in nonwoven fabric sheets from the initiation of heating to the time point of 140 seconds after heating of the nonwoven fabric sheets of Example NWA-1, Comparative Example NWB-1, and Blank BL-1.

From Table 4 and FIG. 8, it could be confirmed that the thermal energy emitted from the PET nonwoven fabric NWA-1 was high.

Test 4

The infrared radiation-emitting material of Example 3A-3 and a PET resin were blended such that the mass ratio between the infrared radiation-emitting material and the PET resin was 1:9, and the mixture was kneaded by using a resin melting and kneading apparatus ("50C type 150" manufactured by Toyo Seiki Seisaku-sho, Ltd.) under the conditions of a heating temperature of 280° C. and a speed of rotation of 100 rpm to produce a masterbatch 3MA-1.

Next, the obtained masterbatch 3MA-1 and the PET resin were blended such that the mass ratio between the masterbatch 3MA-1 and the PET resin was 1:9, and the mixture was melt-spun by using a staple fiber spinning and drawing production apparatus under the conditions of a heating temperature of 280° C. to produce a PET resin staple yarn PSA-2 having a degree of fineness of 8.8 dtex and a fiber length of 51 mm.

The produced staple yarn PSA-2 was used as a raw material, and a web was formed by using a carding machine ("H2DS" manufactured by Ikegami Kikai K.K.). The formed web was laminated in layers with a layering machine ("IK30-2" manufactured by Ikegami Kikai K.K.), and the laminate was produced into a PET nonwoven fabric board NHA-1 having a dimension of 900 mm×900 mm×5 mm and a cloth thickness of 350 g/m² by using a nonwoven fabric needle punching machine ("NL21" manufactured by Fehrer AG).

The produced nonwoven fabric board NHA-1 was applied to a wood drying apparatus to evaluate the drying of wood as follows.

An IF steam type wood drying apparatus (manufactured by Hildebrand Holztechnik GmbH) was used as the wood drying apparatus. In the IF steam type wood drying apparatus, an air blower is installed in a drying chamber, and drying is implemented by circulating steam with its humidity controlled by a dry-wet temperature sensor into the chamber by using the air blower.

The produced nonwoven fabric board NHA-1 was installed without gaps in the inside (wall surfaces and ceiling) of a drying chamber of an IF steam type wood drying apparatus, 170 pieces of wood having a dimension of 2300 mm×82 mm×82 mm and 200 pieces of wood having a dimension of 1150 mm×82 mm×82 mm were placed on a moisture content sensor and then installed in the drying chamber, steam drying was performed for 1085 hours, and the changes in the water content of the wood (material to be dried) were measured. Steam drying was performed by combining an operation of supplying steam having a humidity of 100% for a predetermined time in a state in which the temperature was maintained at 80° C., and an operation of supplying steam having a humidity of less than 100% for a predetermined time in a state in which the temperature was kept lower than 80° C.

Figure 9:
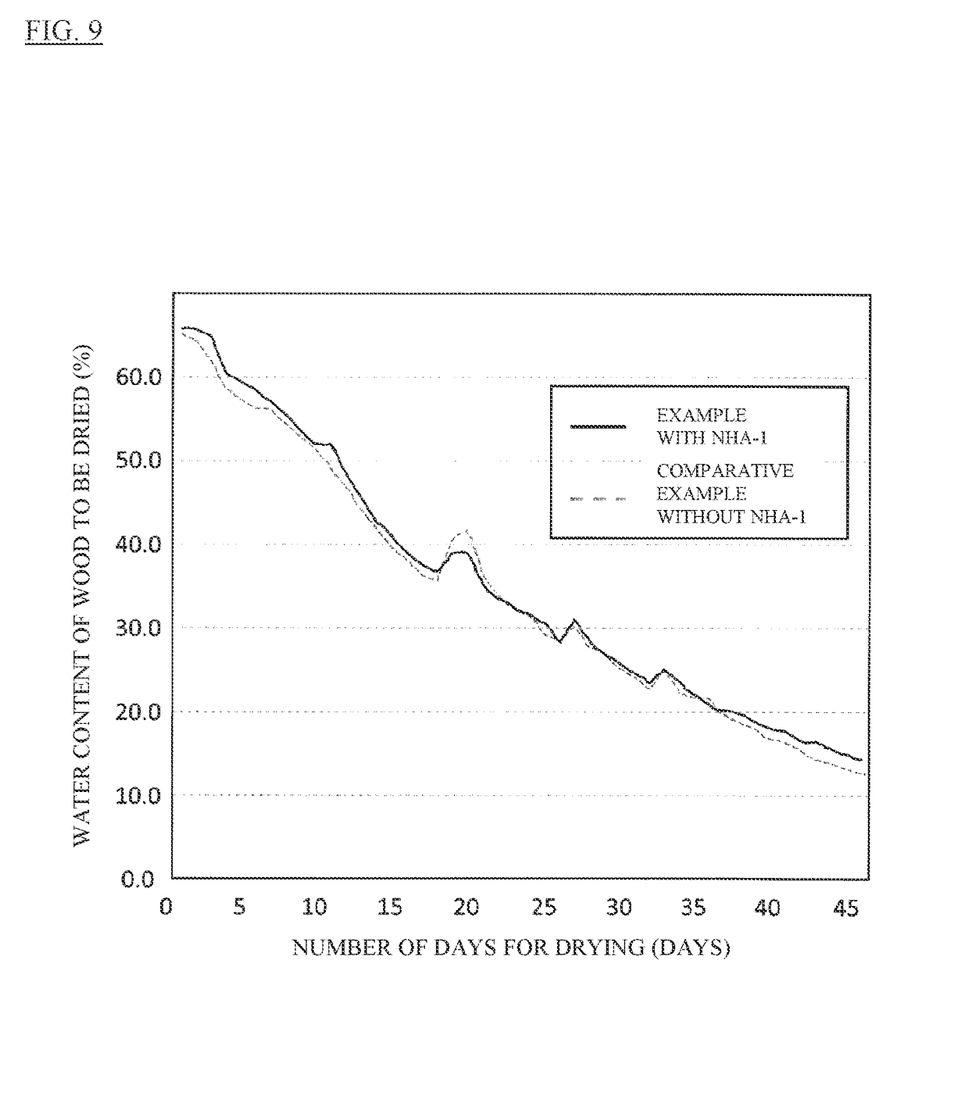
FIG. 9 is a graph showing changes in the water content of wood in a drying experiment of using a drying apparatus provided with a nonwoven fabric board of Example NHA-1 and a drying apparatus that was not provided with the nonwoven fabric board of Example NHA-1.

Next, steam drying of wood was carried out under the same conditions as described above, except that the nonwoven fabric board NHA-1 was removed. The results of changes in the moisture content are shown in FIG. 9.

Furthermore, for the wood after steam drying, the presence or absence of surface cracking and deformation was evaluated. The results are shown in Table 5.

TABLE 5

| | Length of wood to be dried (mm) | Total number of pieces of wood to be dried | Surface cracking | | Deformation | |
|---|---|---|---|---|---|---|
| | | | Number of pieces | Proportion (%) | Number of pieces | Proportion (%) |
| With nonwoven fabric board Example NHA-1 | 2300 | 170 | 0 | 0 | 0 | 0 |
| | 1150 | 200 | 0 | 0 | 0 | 0 |
| Without nonwoven fabric board | 2300 | 170 | 2 | 1.2 | 20 | 11.8 |
| | 1150 | 200 | 10 | 5.0 | 28 | 14.0 |

From FIG. 9, it could be confirmed that when the nonwoven fabric board NHA-1 was installed, the change in the water content was suppressed to a low level as compared with the case where the nonwoven fabric board NHA-1 was not installed. As a result, as shown in Table 5, it is conceived that stress attributable to the shrinkage of wood occurring as a result of a decrease in the water content was suppressed, and damage such as surface cracking and deformation of wood could be suppressed.

Since the infrared radiation-emitting resin composition according to the present invention includes an infrared radiation-emitting material having a high average value of emissivity in a predetermined wavelength range, the infrared radiation-emitting resin composition is suitable as a fiber that is used for clothing materials or the like required to have heat retaining property and as a material that is used for drying of various materials.

The invention claimed is:

1. An infrared radiation-emitting resin composition comprising:
   an infrared radiation-emitting material; and
   a resin,
   wherein the infrared radiation-emitting material includes a titanium dioxide, a layered inorganic compound represented by chemical formula: $Mg_{1-x}Al_x(OH)_2(CO_3)_{x/2} \cdot mH_2O$, where $0 \leq x \leq 0.5$ and $0 \leq m \leq 0.05$, and a nano-sized diamond,
   wherein the nano-sized diamond is excited by infrared radiation,
   in the infrared radiation-emitting material, a mass ratio between the titanium dioxide and the layered inorganic compound is 60:40 to 90:10, and a content of the nano-sized diamond is 0.01 parts by mass or more and 0.5 parts by mass or less with respect to 100 parts by mass of a sum of the titanium dioxide and the layered inorganic compound.

2. The infrared radiation-emitting resin composition according to claim 1, wherein the infrared radiation-emitting resin composition has a plate shape, a tubular shape, a sheet shape, or a fibrous shape, in all of which the infrared radiation-emitting material is dispersed in the resin.

3. The infrared radiation-emitting resin composition according to claim 1, wherein an average particle size of the titanium dioxide is 10 nm or more and 1000 nm or less.

4. The infrared radiation-emitting resin composition according to claim 1, wherein an average particle size of the layered inorganic compound is 10 nm or more and 1000 nm or less.

5. The infrared radiation-emitting resin composition according to claim 1, wherein an average particle size of secondary particles of the nano-sized diamond is 5 nm or more and 200 nm or less.

* * * * *